United States Patent [19]

Hashimoto et al.

[11] Patent Number: 5,675,324

[45] Date of Patent: Oct. 7, 1997

[54] PAGING DEVICE HAVING LAST-TO-FIRST SEQUENTIAL CHARACTER MEMORY SEARCH ROUTINE

[75] Inventors: Shintaro Hashimoto, Ikoma; Toshio Isoe, Yamatokoriyama, both of Japan

[73] Assignee: Sharp Kabushiki Kaisha, Osaka, Japan

[21] Appl. No.: 402,953

[22] Filed: Mar. 13, 1995

[30] Foreign Application Priority Data

Mar. 17, 1994 [JP] Japan ................................ 6-047086

[51] Int. Cl.⁶ ........................................................ H04Q 7/18
[52] U.S. Cl. ........................... 340/825.44; 340/311.1; 455/57.1; 379/56; 235/383
[58] Field of Search ...................... 340/311.1, 825.44, 340/825.47, 825.52, 825.68, 825.69; 455/57.1; 379/56, 217; 235/375, 379, 383

[56] References Cited

U.S. PATENT DOCUMENTS

| 5,173,688 | 12/1992 | Deluca et al. | 340/825.44 |
| 5,221,838 | 6/1993 | Gutman et al. | 340/825.44 X |
| 5,223,831 | 6/1993 | Kung et al. | 340/825.44 |
| 5,258,739 | 11/1993 | Deluca et al. | 340/825.44 |
| 5,363,377 | 11/1994 | Sharpe | 340/825.44 X |
| 5,394,140 | 2/1995 | Wong et al. | 340/825.44 |
| 5,430,439 | 7/1995 | Bodet et al. | 340/825.44 |
| 5,436,619 | 7/1995 | Yun | 340/825.44 |

FOREIGN PATENT DOCUMENTS 5-83855  12/1993  Japan.

*Primary Examiner*—Michael Horabik
*Assistant Examiner*—William H. Wilson, Jr.
*Attorney, Agent, or Firm*—Nixon & Vanderhye P.C.

[57] ABSTRACT

A paging device with a message display function enables a person who possesses the paging device to register plural calling numbers including an area code in a memory section by operating an attached input section. The paging device is arranged such that upon receiving a calling number, a calling number corresponding to the received calling number is searched in last-to-first sequential character order, from a calling number directory registered in the memory section, and the calling number including the area code is displayed on a display section. In this way, even when a calling person transmits the calling number without the area code, the calling number including the area code which is registered beforehand is displayed on the display section of the paging device.

20 Claims, 10 Drawing Sheets

PAGING DEVICE HAVING LAST-TO-FIRST SEQUENTIAL CHARACTER MEMORY SEARCH ROUTINE

FIELD OF THE INVENTION

The present invention relates to a paging device with a message display function for displaying a received message.

BACKGROUND OF THE INVENTION

A paging service for communicating from a calling person to a called person by radio transmission is generally known. In order to enable such communications, there has been a strong demand for a paging device with a message display function which permits a message composed of numerals and/or letters.

Conventionally, there are two types of paging devices with a message display function: the digital display paging device and the character display paging device. In the digital display paging, a calling person sets a numeral string such as a calling number, etc., directly by a telephone of the Push-Button dialing system so as to transmit the numeral string by radio wave, and the numeral string is displayed on the paging device possessed by the called person. On the other hand, in the character display paging device, a calling person inputs a character string composed of both functional symbol such as a sharp # or an * asterisk and numerals as desired by a telephone of the Push-Button dialing system, or a personal computer, or by calling an operator to ask her to input a message composed of numerals and/or letters using a keyboard, and the same message is displayed onto the paging device possessed by the called person by radio wave.

However, the described display paging devices present some drawbacks. Namely, in the numeral display paging device, except the calling number, each message is a combination of numerals, and is designed for a digital code message display. Therefore, the called person is required either to memorize the meaning of the digital code message or possess a collation list. In the character display paging device, a complicated operation using the functional symbols #, *, etc., is required for the calling person, or the troublesome process of asking the operator to input the message is required.

In order to eliminate such drawbacks, Japanese Laid-Open Patent publication No. 293324/1992 (Tokukaihei 4-293324) discloses a paging device with a message display function having the following arrangement. The person who possesses the paging device operates a switch key array so as to register person's name, calling number, code message, etc. with the information of registration number attached thereto so that when the calling information composed of numeral string corresponding to the registration number is received, based on the received calling information, a person's name, calling number, code message, etc., which are registered beforehand in the corresponding address are searched so as to be displayed. In the described arrangement, the calling person is required only to directly input numerals using a telephone of the Push-Button dialing system. In this arrangement, the person who possesses the paging device is required only to read the message transmitted from the called person.

Japanese Laid-Open Utility Model Application No. 83855/1993 (Jitsukaihei 5-83855) discloses an electronic organizer compatible with a pager, which is composed of an electronic organizer main body and an IC card for the pager. The main body having an organizing function for organizing information of address directory or telephone directory includes a control section composed of CPU and memory, a keyboard, a display section, a buzzer, an IC card insertion hole, and a connecting terminal. The IC card for the pager to be inserted into the IC card insertion hole of the main body is provided with a recognizing section composed of a receiving section, CPU, memory and a connecting terminal. The electronic organizer is arranged such that when the receiving section of the IC card recognizes that a radio calling signal is received from an external device, a received signal corresponding to the received message is transmitted to the control section of the main body through the connecting terminal. Then, the main body beeps in response to the input signal and, in the meantime, displays the received message with information on file related to the received message such as person's name, address etc. on the display section.

Although demand for the paging device is increasing, still, the most popular use of the paging device is simple. Namely, the calling person transmits a calling number to be displayed on the paging device possessed by the called person and the latter calls the calling person by the displayed calling number. In this system, the operation is required only to input the calling number through the telephone of the Push-Button dialing system, thereby having an advantage of simple operation.

However, in the described paging device with a simple function, when the calling person dials the calling number without an area code, the called person is required to look for the area code if the area code is required to dial, which may be troublesome. Or if the calling person dials the calling number including the area code, the calling person incurs the troublesome work. Additionally, the previously described electronic organizer compatible with the pager is associated with the same problem.

In the paging device of the Japanese Laid-Open Patent Publication, by registering the calling number including the area code beforehand, the calling number including the area code can be displayed upon receiving the calling information without requiring troublesome work for the called person. However, it is required to set common calling information between the calling person and the called person. Therefore, the described function does not work effectively in the case of receiving messages from plural persons.

SUMMARY OF THE INVENTION

An objective of the present invention is to provide a paging device with an improved function for allowing a calling number including an area code to be displayed by registering beforehand the calling number including the area code in the paging device even when a calling person dials the calling number without the area code.

Another objective of the present invention is to provide a paging device with an improved function for allowing supplemental information such as person's name, etc., attached to the calling number to be displayed with the calling number.

A still further objective of the present invention is to provide a paging device with an improved function for distinguishing whether a received calling number is a telephone number or a facsimile number.

In order to achieve the above objectives, the paging device having a message display function of the present invention is characterized by comprising:

(a) receiving means for receiving information of a calling number;

(b) input means for inputting a calling number including an area code to be registered;

(c) memory means having a memory area for storing plural registered calling numbers inputted by the input means;

(d) search means for comparing the information of a calling number received by the receiving means with a character string of a registered calling number stored in the memory means in order from a last character to a first character so as to search a registered calling number composed of at least a same number of characters as the received calling number and including a same character string starting with a last character as a character string from the last character to the first character of the calling number received by the receiving means; and (e) display means for displaying the registered calling number searched by the search means.

According to the described arrangement, under the condition that the user registers plural calling numbers beforehand in the memory means by operating the attached input section, upon receiving a calling number, the search means detects a registered calling number corresponding to the received calling number by making a search from the registered calling number directory stored in the memory means, and the registered calling number thus detected is displayed by the display means. Therefore, under the condition that a called person who possesses the paging device registers the calling number including the area code beforehand, even when the calling number is received without the area code, the called person can see the calling number including the area code.

In order to achieve the above objective, the paging device in accordance with the present invention having the described arrangement is also characterized in that the memory means includes a memory area for storing supplemental information including at least a person's name inputted by the input means registered so as to be paired with the corresponding registered calling numbers as desired by operating the input means, and that the display means also displays the corresponding supplemental information when displaying the registered calling number searched by the search means.

According to the described arrangement, under the condition that the person who possesses the paging device registers plural calling numbers with respective supplemental information including at least a person's name, etc., attached thereto, upon receiving the calling number, the search means detects the registered calling number corresponding to the received calling number by making a search among the registered calling number directory stored in the memory section. Then, the registered calling number thus detected is displayed with the supplemental information attached thereto. Therefore, under the condition that the called person registers the calling number including the area code beforehand, even when the calling person transmits the calling number without the area code, the called person can see the calling number including the area code as in the case of the previous arrangement. In addition, the called person can see the name of the person to be called, etc., as well. In the Japanese Laid-Open Publication described under BACKGROUND OF THE INVENTION, by registering the person's name, the calling number can be set as a registration information number. However, since the person's name is displayed instead of the calling number, it is required to search the calling number based on the person's name. For this reason, the described conventional function is not quite convenient.

The paging device with a message display function, having the above arrangement may be characterized in that the memory means includes a first memory area for storing registered calling numbers inputted by the input means, each registered calling number being specified either as a telephone number or a facsimile number, in such a manner that the registered calling numbers are classified into telephone numbers and facsimile numbers, and a second memory area for storing plural fixed messages for telephone numbers or facsimile numbers, the search means includes judging means for determining whether a registered calling number is a telephone number or a facsimile number when detecting the registered calling number corresponding to the received calling number from the first memory area, and selection means for selecting a fixed message for telephone numbers or facsimile numbers from the second memory area based of a result of determination by the judging means, and that the display means displays the registered calling number searched by the search means as well as a fixed message selected by the selection means.

According to the above arrangement, telephone numbers and facsimile numbers can be registered in a distinguishable manner, and the difference between the telephone number and facsimile number can be determined by the search means when searching the corresponding calling number. For example, in the case where the corresponding calling number is a telephone number, a fixed message such as "Please make a call", etc., is also displayed with the telephone number. On the other hand, in the case where the corresponding calling number is a facsimile number, a fixed message such as "Please send a facsimile", etc., is also displayed with the facsimile number. Therefore, under the condition that the called person who possesses the paging device registers the calling number including the area code beforehand, even when the calling person transmits the calling number without the area code, the called person can see the calling number including the area code. Additionally, the called person can distinguish whether the calling number is a telephone number or a facsimile number, thereby eliminating the possibility of re-dialing.

For a fuller understanding of the nature and advantages of the invention, reference should be made to the ensuring detailed description taken in conjunction with the accompanying drawings.

BRIEF DESCRIPTION OF THE DRAWINGS

FIG. 6(a) and FIG. 6(b) are perspective views showing outer arrangements of the paging device with a message display function in accordance with another embodiment of the present invention, wherein FIG. 6(a) shows the case where a key input is made and FIG. 6(b) shows the case of portable type where a key input is not made.

DESCRIPTIONS OF THE EMBODIMENTS

The following descriptions will discuss one embodiment of the present invention with reference to FIG. 1 through FIG. 11.

Figure 2:
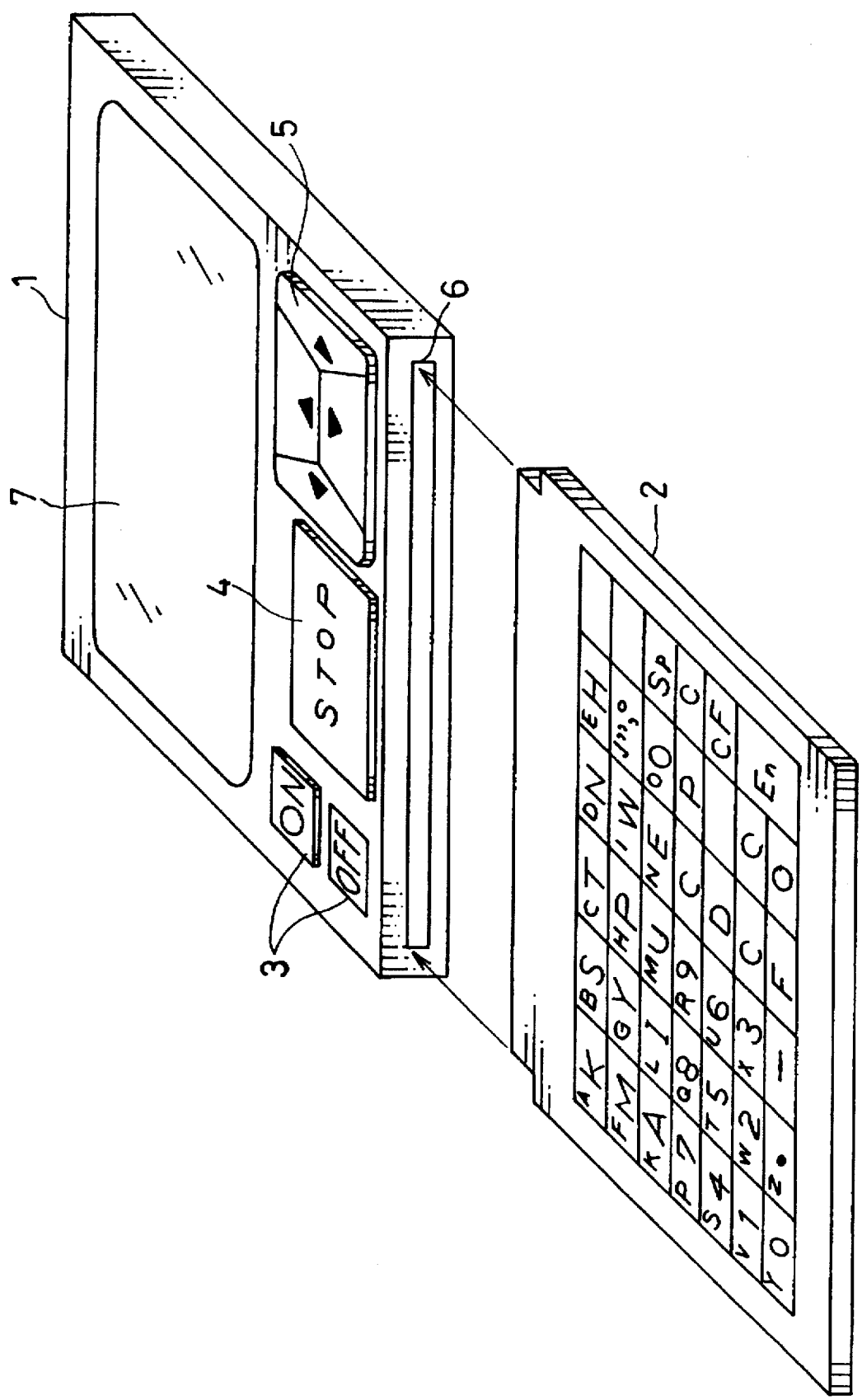
FIG. 2 is a perspective view showing an outer arrangement of the paging device with a message display function of FIG. 1.

The outer arrangement of a paging device with a message display function (hereinafter simply referred to as a paging device) in accordance with the present embodiment will be explained in reference to FIG. 2.

The paging device is composed of a main body 1 of a flat plate and an input section 2 for inputting information. On the upper surface of the main body 1, a display section 7 is formed for displaying messages composed of numerals, letters, etc. A power switch 3 for controlling ON/OFF of the power supply of the main body 1, a stop key 4 for instructing a stoppage of an informing sound and a direction indicative key 5 for use in calling most current information and moving a cursor are also formed on the upper surface of the main body 1.

Figure 1:
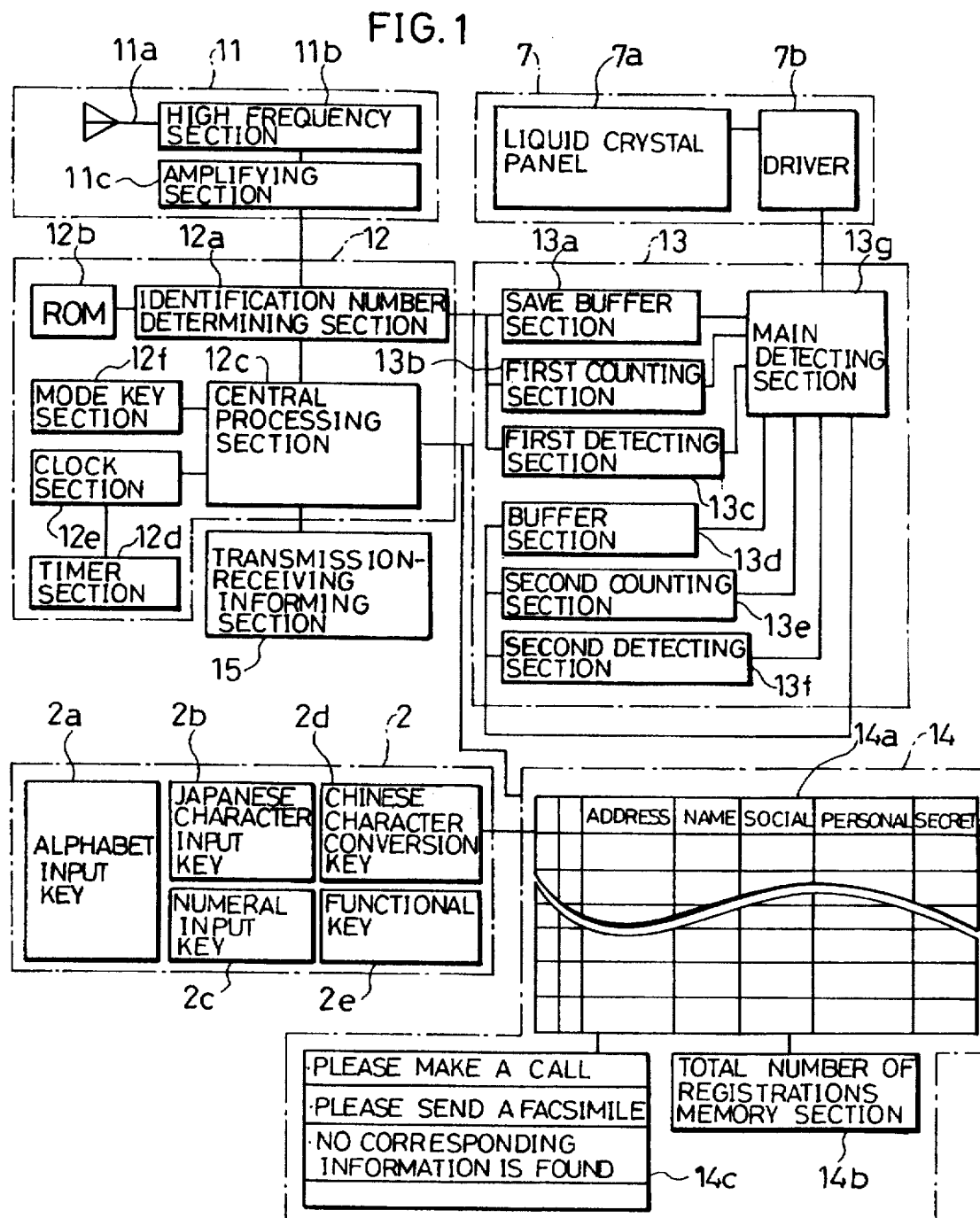
FIG. 1 is a block diagram showing the configuration of essential parts of a paging device with a message display function in accordance with one embodiment of the present invention.

The display section 7 is composed of a liquid crystal panel 7a which enables a dot matrix display and a liquid crystal driver section 7b for driving the liquid crystal panel 7a (see FIG. 1). By employing the liquid crystal panel 7a in the display section 7, the main body 1 can be made thinner.

On one side face of the main body 1 (towards the user's side), a connecting section 6 as a connector for connecting the main body 1 to the input section 2 is provided so as to be detachable from the main body 1. As described, since the input section 2 is detachable from the main body 1, the input section 2 can be connected to the main body 1 only when necessary, and otherwise the main body 1 can be used alone, thereby achieving an effect of an improved portability by reducing the size of the paging device.

The input section 2 is provided with a plurality of keys: an alphabet input key 2a, a Japanese character input key 2b, a numeral input key 2c, a Chinese character conversion key 2d and a functional key 2e (see FIG. 1). The input section 2 is composed of a letter input section for inputting information composed of letters using the alphabet input key 2 and the Japanese character input key 2b, a numeral input section for inputting information composed numerals using the numeral input key 2c, a translation instructing section for translating characters using the Chinese character conversion key 2d, and an instructing section for giving instructions for various processes such as storing inputted characters using the functional key 2e. The described keys provided on the input section 2 of the paging device are of sheet type, thereby enabling a thinner input section 2.

In the paging device, personal information such as name, address, telephone number, etc., can be inputted in the known manner which is the same manner as the generally used electric organizers. Therefore, the explanations thereof shall be omitted here.

The entire configuration of the paging device in accordance with the present invention will be explained below in reference to the block diagram of FIG. 1.

The paging device of the present embodiment includes the input section 2, the display section 7, a receiving section 11, a control section 12, a judging section 13, a storing section 14 (memory means) and a transmission informing section 15. All of the above sections are provided in the main body 1 except the transmission informing section 15. In the present invention, the control section 12 and the judging section 13 constitute the search means of the present invention.

The receiving section 11 includes a receiving antenna 11a of a flat plate, a high frequency section 11b and an amplifying section 11c. The receiving antenna 11a of a flat plate is formed on a surface in contact with an outer surface of the paging device for receiving various radio transmissions from the transmission end of the paging system. The antenna 11a is arranged so as to receive a predetermined radio frequency (wavelength) from the transmission end of the paging system. The high frequency section 11b and the amplifying section 11c are provided for tuning, shaping, detecting and amplifying the received radio waves. By transmitting through these sections, the radio transmission signal is converted either into a signal indicative of an identification number and a signal indicative of a calling number inputted by the calling person to be outputted to the following process.

The control section 12 includes an identification number determining section 12a for determining whether or not a calling number received by the receiving section 11 is the identification number of the paging device, a ROM 12b (Read Only Memory) for storing an identification number of the paging device, a central processing section 12c which serves as a main control of the paging device, a timer section 12d, a clock section 12e and a mode key section 12f. The mode key section 12f is composed of the power switch 3, the stop key 4 and the direction instructive key 5 (see FIG. 2) which are provided on the main body 1. The identification number determining section 12a determines whether or not the received identification number is identical with the identification number stored in the ROM 12b. If the call is made for the paging device in the user's possession, the received identification number should be identical with the identification number stored in the ROM 12b. Therefore, whether or not the call is made for the paging device can be determined. If the received calling number is not identical with the identification number stored in the ROM 12b, the calling number to be received subsequent to the identification number is gated by the identification number determining section 12a so that the calling number is not inputted to the device. On the other hand, if the received identification number is identical with the identification number stored in the ROM 12b, the calling number transmitted subsequent to the identification number is received and outputted to the judgement section 13 so as to be temporarily stored in a save buffer section 13a. In the meantime, the central processing section 12c gives an instruction to a memory section 14 so that telephone numbers and facsimile numbers which are subject to searching are outputted from an address directory memory section 14a to the judging section in order as many calling numbers as specified by a total number of registrations memory section 14b (to be described later).

The judging section 13 includes the save buffer section 13a for storing the calling number received by the receiving section 11, the first counter section 13b for counting the number of characters contained in the received calling number, the first detecting section 13c for detecting the location of a symbol such as a sharp # or an asterisk * contained in the received calling number, the buffer section 13d for storing the registered calling number stored in the memory section 14 of the main body 1, the second counter section 13e for counting the number of characters in the registered calling number, the second detecting section 13f for detecting the location of the symbol such as # and * in the registered calling number and a main detecting section 13g. The count section 13b is provided with a single counter, while the first detecting section 13c, the second counting section 13e and the second detecting section 13f are respectively provided with plural counters. The main detecting section 13g of the judging section 13 is arranged so as to receive outputs from the save buffer section 13a, the first counter section 13b, the first detecting section 13c, the buffer section 13d, the second counter section 13e and the second detecting section 13f and also receive the output indicative of the kind of calling number (determining whether the calling number is a telephone number or a facsimile number) from the memory section 14. The main detecting section 13g searches the received calling number from the directory of the registered calling numbers in the memory section 14 by repeating the described judgement under the control of the main processing section 12c of the control section 12.

The memory section 14 includes the address directory memory section 14a, the total number of registrations memory section 14b and a fixed message memory section 14c.

Figure 10:
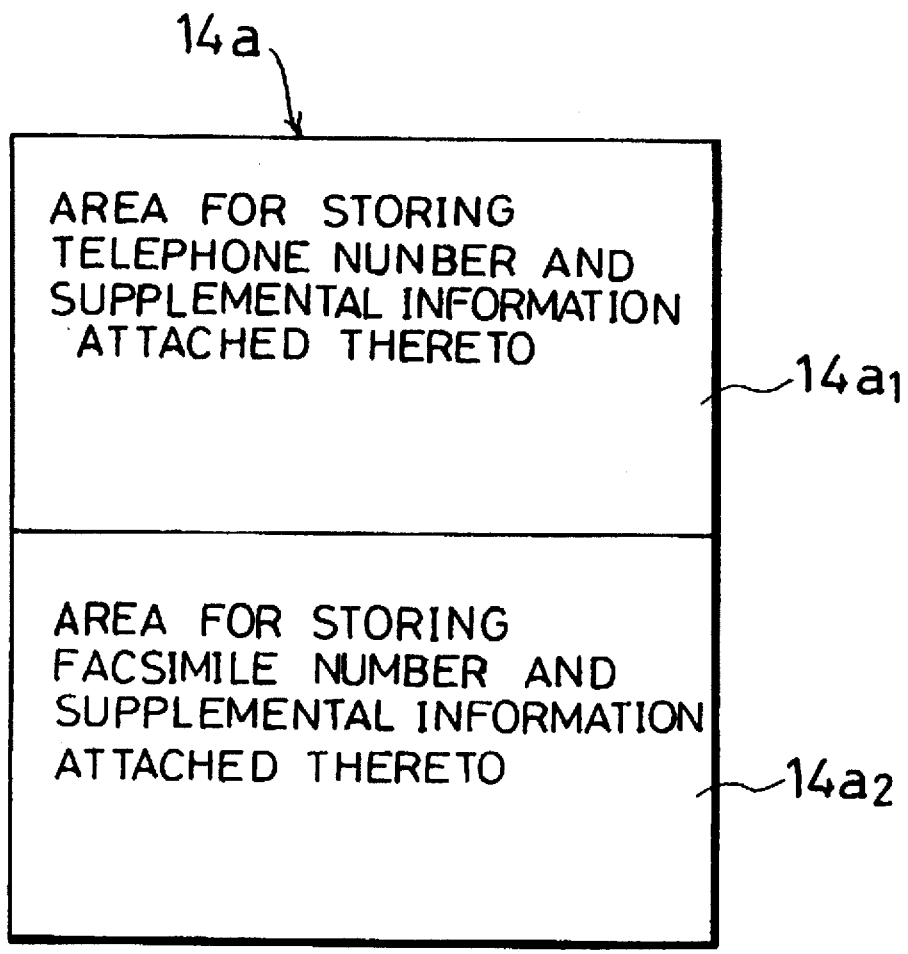
FIG. 10 is a block diagram showing the configuration of essential parts of the memory section of the paging device with a message display function.
Figure 11:
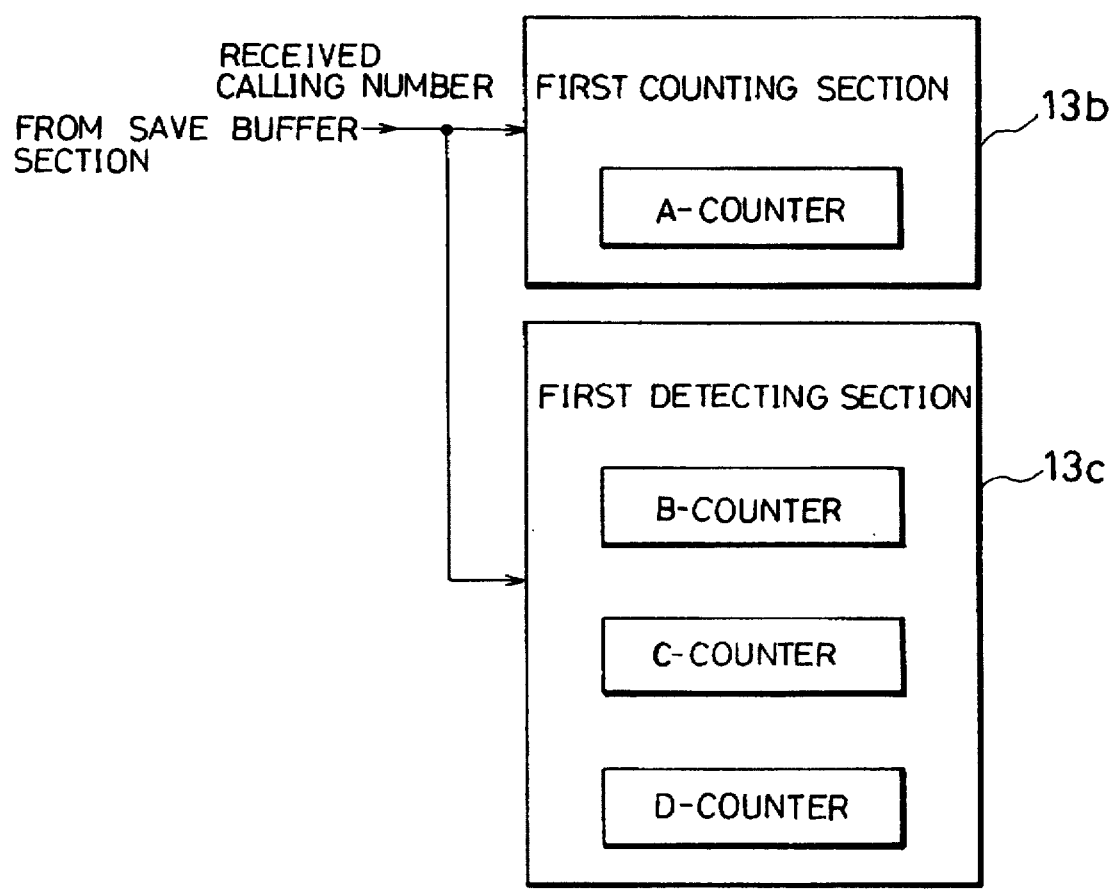
FIG. 11 is a block diagram showing the configuration of essential parts of the first counter section and the first detecting section of the paging device with a message display function.

In the address directory memory section 14a, a telephone number, a facsimile telephone number as well as supplemental information such as address, person's name, social information, personal information, secret information attached thereto are registered. When the user registers a calling number by operating the input section 2 shown in FIG. 2, whether the calling number is the telephone number or facsimile number can be specified. An example of the method for registering calling numbers so as to be classified by the kinds of calling numbers (telephone number or facsimile number) is shown in FIG. 10. Namely, the address directory memory section 14a is divided into the memory area $14a_1$ for storing telephone numbers and supplemental information attached thereto and a memory area $14a_2$ for storing facsimile numbers and supplemental information attached thereto so as to store the telephone numbers and the facsimile numbers separately. Alternatively, it may also arranged so as to add the supplemental information indicative of whether the calling number is a telephone number or a facsimile number is added to each calling number to be registered. The total number of registrations memory section 14b is provided for storing the total number of registrations in the address directory memory section 14a. In the fixed message memory section 14c, fixed messages such as "Please make a call.", "No corresponding information is found.", etc., are stored.

A transmission-receiving informing section 15 is arranged as follows: when the identification number determining section 12a confirms the identification number, based on a signal from the central processing section 12c, the clock section 12e for activating the paging device converts the signal into a low frequency signal and then amplified so as to give an alarm sound from a speaker (not shown) for a predetermined time. This alarm sound may be stopped before the predetermined time has passed by pressing the stop key 4 shown in FIG. 2 provided on the mode key section 12f.

The searching operation and the display control operation by the control section 12 and the judging section 13 will be explained below in detail.

First, the symbol location indicative information stored in the first detecting section 13c is compared with the symbol location indicative information stored in the second detecting section 13f.

For example, assumed that the calling number outputted from the address directory memory section 14a is "01234-5-6789". In this case, in the second detecting section 13f, information indicative of the locations of the symbol ("-") counted from the last character ("9") of the registered calling number are stored, i.e., "5" and "7" as well as information indicative of the number of characters counted from the last character to the front character ("0") plus one, i.e., "13". Similarly, assumed that the receiving calling number is "45*6789". In this case, in the first detecting section 13c, the information indicative of the location of the symbol "*" counted from the last character ("9"), i.e., "5" is stored as well as the information indicative of the number of characters in the received calling number counted from the last character to the front character ("4") plus one, i.e., "8".

The main detecting section 13g determines whether the position-indicative information stored in the second detecting section 13f is identical with the position-indicative information stored in the first detecting section 13c. This judgement is made only when the respective information are stored. In the described examples, "5" and "7" stored in the second detecting section 13f and "5" and "8" stored in the first detecting section 13c are subject to the judgement. In this case, as the respective position-indicative information are not identical, it is obvious that the received calling number is not identical with the registered calling number without checking the full number.

Assumed that the received calling number is "6*7890", and "5" and "7" are stored in the first detecting section 13c in the described manner. In this example, since the location of the symbol in the registered calling number is identical with the position of the symbol in the received calling number, the process goes onto the second stage. In order to enable the judgement also in the case where neither of the registered calling number and received calling number contain any symbol, if both of the calling numbers contain single location-indicative information (information indicative of the number of characters plus one), the process goes onto the second stage.

For example, assumed that the received calling number is "456789", the number of characters "6" is stored in the first counter section 13b. On the other hand, as the calling number outputted from the address directory memory section 14a is "01234-5-6789", the number of characters divided by symbols (-), i.e., "5", "1" and "4" are stored in the second counting section 13e. In the next stage, the respective combinations of these values counted from the last character are computed, i.e., "4", "(4+1)" and "(4+1+5)=10". Then, the combinations thus computed are compared with the value stored in the first counter section 13b. In this example, since the value stored in the first counter 13b is not identical with any combinations of values, it is determined that the received calling number is not identical with any of the registered calling numbers.

Assumed that the received calling number is "6-7890, and "5" is stored in the first counter section 13b. In this case, since the calling number stored in the first counter section 13b is identical with one of the combinations of values of the second counter section 13e, the process goes on to the next step of collating numbers.

If the received calling number is "56789", "56789" is stored in the save buffer, and by comparing this calling number with the registered calling number stored in the buffer section 13d from the last character so as to determine whether or not any of the registered calling numbers includes the same character string starting with the last character with the received calling number, it is determined whether or not the received calling number and the registered calling number are practically identical. In this way, even if the calling number is received without the area code, an accurate detection of the corresponding calling number can be achieved.

Then, the supplemental information including the person's name, i.e., stored in the address directory memory section 14a which corresponds to the detected calling number is outputted to the liquid crystal driver section 7b of the liquid crystal section 7, and is converted into a segment signal and a common signal which are used in driving the liquid crystal panel 7a in the liquid crystal driver section 7b so as to display the supplemental information on the liquid crystal panel 7a.

As described, when the registered calling number is outputted to the buffer section 13d by the address directory memory section 14a, the kinds of output information (information determining whether the calling number is a telephone number or a facsimile number) is also outputted to the main detecting section 13g. Based on the output, the main detecting section 13b reads information "Please make a call." from the fixed message memory section 14c of the memory section 14 when the received calling number is identical with a registered calling number in the telephone directory. On the other hand, when the received calling number is identical with a registered calling number in the facsimile directory, the main detection section 13b reads information "Please send a facsimile". In both cases, the corresponding information from the address directory memory section 14a as well as the corresponding fixed messages (supplemental information) are outputted to the display section 7. The information from the address directory memory section 14a and the corresponding fixed message (supplemental information) are combined to be displayed on the display section 7. Additionally, under a column (social information) of the corresponding supplemental information of the address directory memory section 14a, a time at which the calling number is received is stored by the timer section 12d.

Before displaying the information, if the corresponding information from the address directory memory section 14a is registered under the secret information for requesting not to display, only the detected registered calling number and the supplemental information from the fixed message memory section 14c are combined to be displayed. Thus, other supplemental information such as person's name address, etc., are not displayed.

On the other hand, if there is no corresponding information, the main detecting section 13g reads the information "No corresponding information is found" stored in the fixed message memory section 14c, and outputs it to the display section 7 with the received calling number. Therefore, the information "No corresponding information is found" is combined with the calling number so as to be displayed on the display section 7. Additionally, the time at which the calling number is received is registered in the address directory memory section 14a as additional information.

The message displayed on the display section 7, which is composed of the calling number, supplemental information, additional information, etc., disappears like an alarm sound after a predetermined time has passed. However, if the information is needed at a later time, by operating the direction indicative key 5 shown in FIG. 2 of the mode key section 12f, the information can be recalled.

Figure 3:
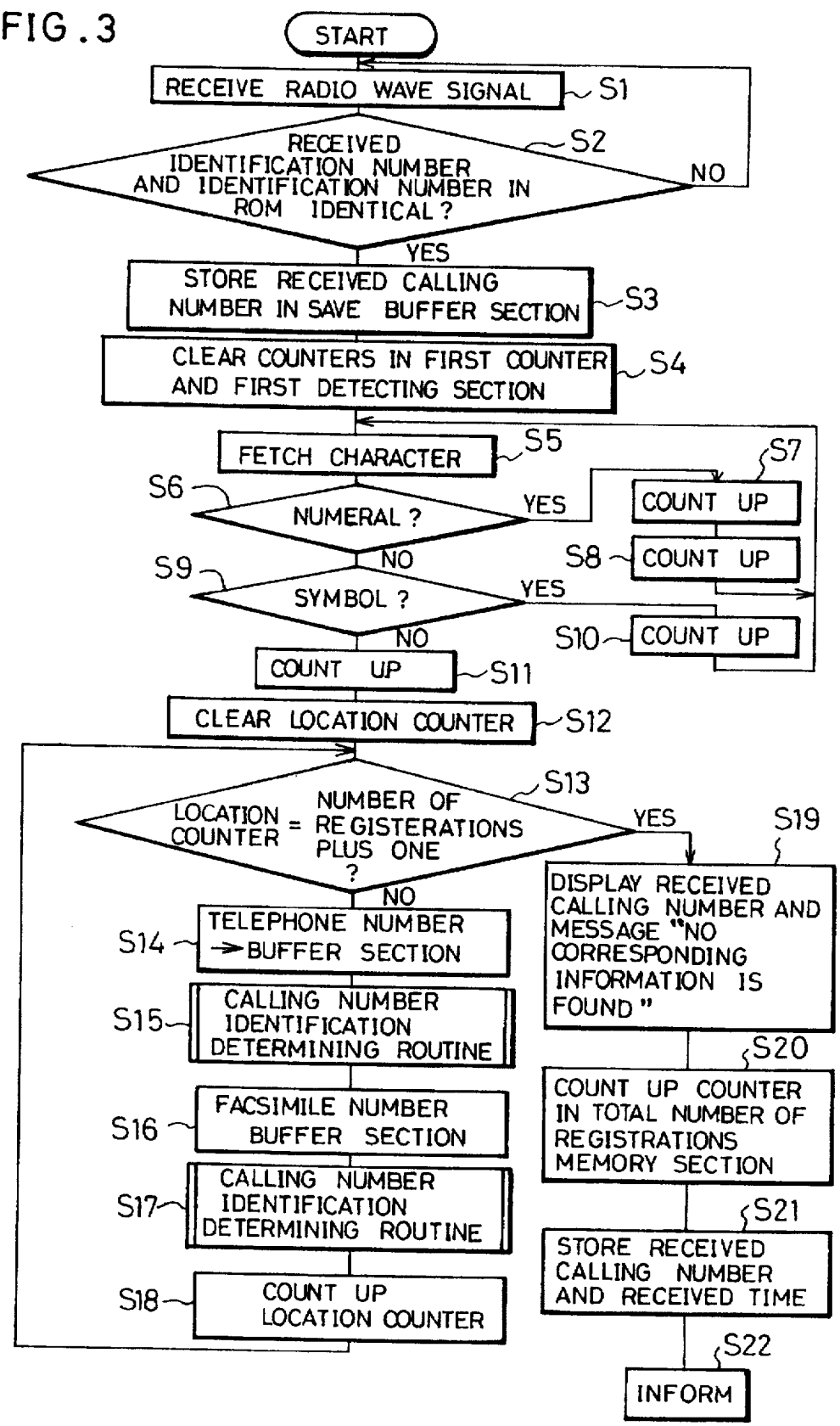
FIG. 3 is a flowchart showing processes by the paging device with a message display function of FIG. 1.
Figure 4:
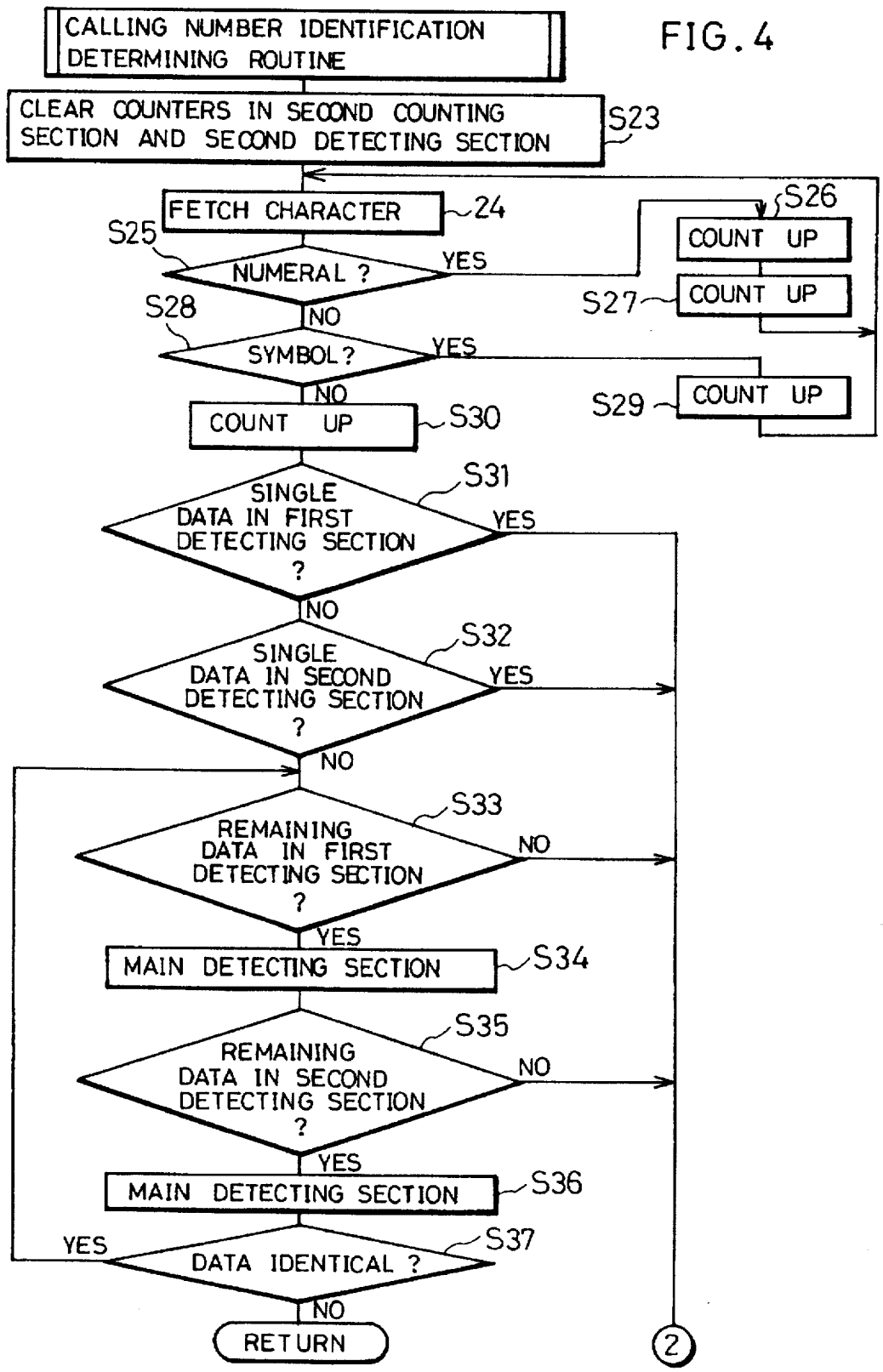
FIG. 4 is a flowchart showing a part of a calling number identification determining routine to be carried out by the paging device with a message display function.

The operations by the paging device of the present embodiment will be explained in reference to FIG. 1 and FIG. 2 and flowcharts of FIG. 3 through FIG. 5.

When a radio wave signal is received by the receiving antenna 11a (S1), and an identification number and the calling number are received, the identification number determining section 12a determines whether or not the received identification number is identical with the identification number stored in the ROM 12b (S2). If the identification number determining section 12a determines that the received identification number is not identical with the identification number stored in the ROM 12b, the sequence goes back to S1, to be ready to receive the next identification number.

On the other hand, if it is determined that the received identification number and the identification number stored in the ROM 12b are identical in S2, the calling number to be received subsequent to the identification number is temporarily stored in the save buffer section 13a (S3).

When the received calling number is stored in the save buffer section 13a in S3, A-counter used in the first counting section 13b and B-counter, C-counter and D-counter used in the first detecting section 13c are cleared (S4). As described, the B-counter in the first detecting section 13c counts the location of the symbol which comes first when counting from the last character (if no symbol is contained in the calling number, the number of characters in the calling number plus one is counted from the last character). The C-counter in the first detecting section 13c counts the location of the symbol which comes second from the last character of the received calling number or counts the number of characters plus one. (Here, if the number of characters from the last character to the first character has been already counted by the B-counter, the counting is not performed). The D-counter of the first detecting section 13c counts the number of characters from the last character to the front character plus one (Here, if the number of characters from the last character to the first character has been already counted by the B-counter or C-counter, the counting is not performed).

After the respective counters are cleared, the received number stored in the save buffer section 13a is fetched a character by a character from the last character (S5).

Then, it is determined whether the fetched character is a numeral or not (S6). If so, the A-counter of the first counter section 13b is counted up by 1 (S7), and the B-counter of the first detecting section 13c is also counted up by 1 (S8). Thereafter, the sequence goes back to S5, and the next character counted from the last character is fetched.

Then, if it is determined that the character is not a numeral in S6 and further determined that the character is not a symbol in S9, it is determined that all the characters in the calling number have been fetched, and only the A-counter of the first counter section 13b is counted up by 1 (S11). Then, the respective values in the save buffer section 13a, the first counter section 13b and the first detecting section 13c can be computed.

Next, the location counter indicative of the called location of the address directory memory section 14a is cleared (S12). Then, it is determined whether or not the value of the location counter is identical with the number of registrations stored in the total registration number memory section 14b plus one.

If not in S13, the processes in S14–S18 is performed with respect to the registered calling number at the first location in the location counter so as to determine whether or not the registered calling number is identical with the received calling number. Namely, the calling number of the position indicated by the location counter is stored in the buffer section 13d (S14), and a identification number determining routine is executed (S15). Then, the facsimile number pointed out by the location counter is stored in the buffer section 13d (S16), and the calling number identification determining routine is executed (S17). If the calling number is determined to be identical, according to the process (to be described later), the registered calling number detected by the search and the supplemental information attached thereto are displayed on the display section 7. On the other hand, when it is determined that the received calling number is not identical with the registered calling number, the location counter is counted up by 1 (S18), and the sequence goes back to S13 to repeat the described operations.

In the described manner, the operations in S13–S18 are repeated. After the search of the information is completed to the end of the memory region, if it is determined that no corresponding registered calling number is found, it is determined that the received calling number is not stored in the address directory memory section 14a. This can be confirmed by the fact that the value of the location counter is identical with the total number of registrations plus one stored in the total number of registrations memory section 14a. If it is determined in S13 that the value of the location counter is identical with the registered calling number plus one, the received calling number is combined with the fixed message "No corresponding information is found", and the combined information is displayed on the display section 7 (S19).

Since the corresponding information is not found in the address directory memory section 14a, in order to store the received calling number as new information, the value in the total number of registrations memory section 14b is counted up by +1 (S20), and the received calling number is stored in the transmitting and receiving use calling number location position, and the received time is stored under the column of the social information (S21), and the alarm sound is beeped so as to inform the person holding the paging device that the calling number is received (S22).

Figure 8:
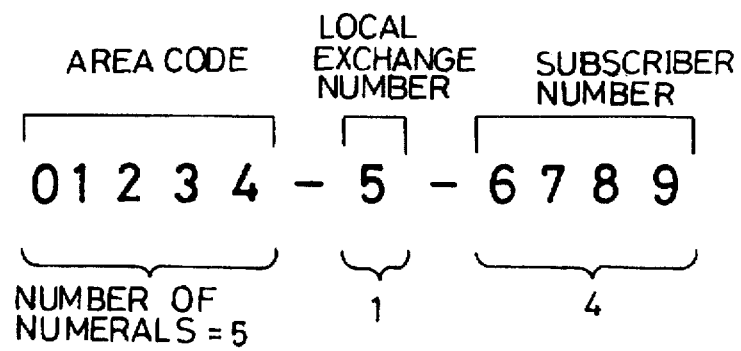
FIG. 8 is an explanatory view showing one example of calling numbers.
Figure 9:
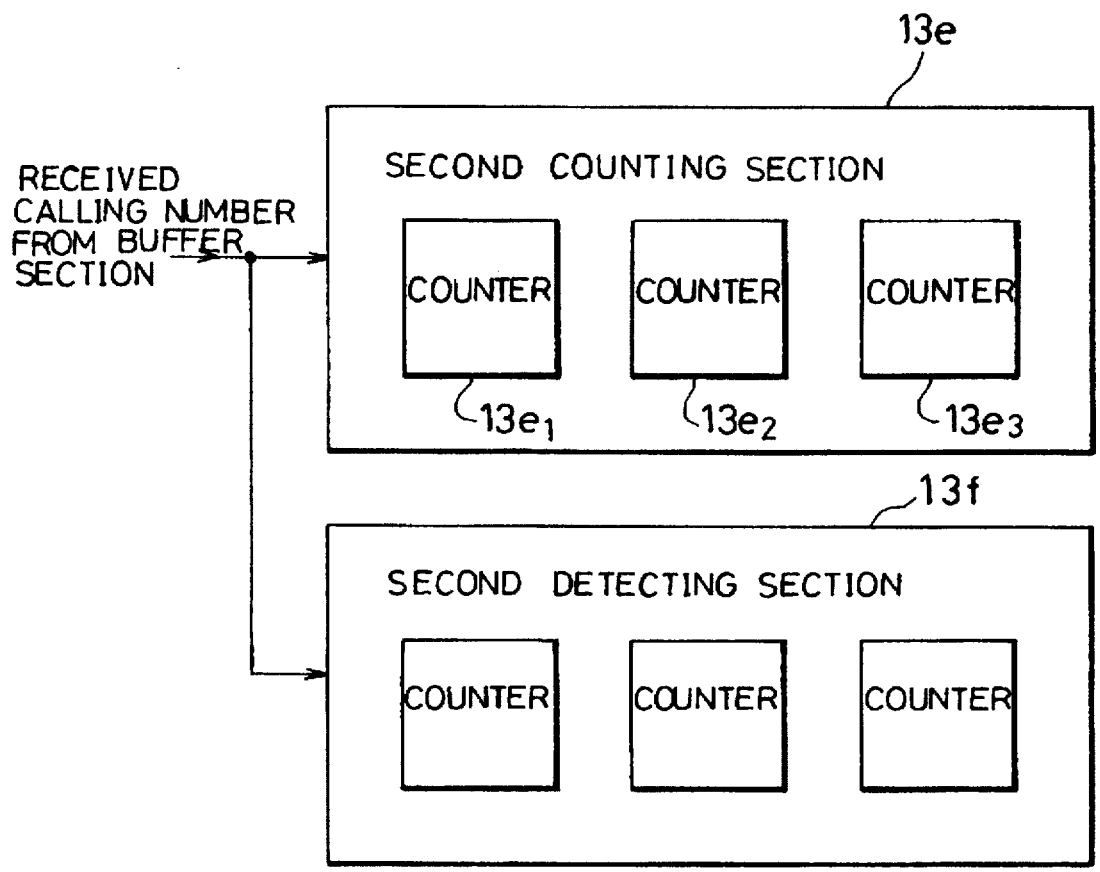
FIG. 9 is a block diagram showing essential parts of the second counter section and the second detecting part of the paging device with a message display function.

Next, the telephone number identification determining routine in S15 and S17 will be explained. First, the counters in the second counter 13e and the second detecting section 13f are cleared (S23 in FIG. 4), and the processes in S24–S30 are repeated in the same manner as S5–S11, and the number of characters in the registered calling number and the location of the symbol stored in the buffer section 13d are detected. Here, different from the first counter section 13b including a single counter, plural counters are provided the second counter section 13e (see FIG. 9). If it is determined that the symbol is included in the registered calling number in S28, before and after the symbol, counting is performed by another counter. For example, as shown in FIG. 8, when the registered calling number is composed of an area code (01234), a symbol (-), a local exchange number (5), a symbol (-) and a subscriber number (6789), i.e., "01234-5-6789", the respective total numbers of the subscriber number, the local exchange number and the area code are counted by separate counters $13e_1$, $13e_2$ and $13e_3$. Specifically, the counter $13e_1$ counts the number of characters from the last character to the last symbol (corresponding to the subscriber number in FIG. 8), and the counter $13e_2$ counts the number of characters from the character which comes next to the last symbol when counting from the last character to the first symbol (corresponding to the local exchange number in FIG. 8), and the counter $13e$ counts the number of characters from the first character which comes next to the first symbol when counting from the last character to the next symbol (corresponding to the area code in FIG. 8).

After detecting the number of characters in the registered calling number stored in the buffer section 13d and the symbol location in S24–S30, the sequence goes onto the next step so as to determine whether or not single data is detected in the first detecting section 13c (It is counted only by the B-counter not by the C-counter nor the D-counter). Namely, it is determined that whether or not the symbol is contained in the received calling number (S31). If so, the sequence goes onto S40 in FIG. 5.

On the other hand, if it is determined that more than single data are counted in S31, it is further determined whether or not signal data is detected in the second detecting section 13f (S32). If so in S32, the sequence goes onto S40. If it is determined that more than single data are counted in S32, the operations in S33–S37 are repeated until the count value in one detecting section disappears. When the count value in one detecting section disappears, i.e., if not in S33 or S35, the sequence goes onto S40. Namely, the received calling number stored in the save buffer 13a and the registered calling number stored in the buffer section 13d are transmitted to the main detecting section 13g from the last character in order (S34 and S36), and the main detection section 13g determined whether or not the numbers of the same digit are identical (S37). Before the count value in either the received calling number and the registered calling number disappear, the difference in the numbers of the same digit is detected in S37, it can be seen that the registered calling number stored in the buffer section 13d is not identical with the received calling number stored in the save buffer section 13a, the sequence goes back to S16 in the case of the calling number identification determining routine in S15 or to S18 in the case of the calling number identification determining routine in S17.

Figure 5:
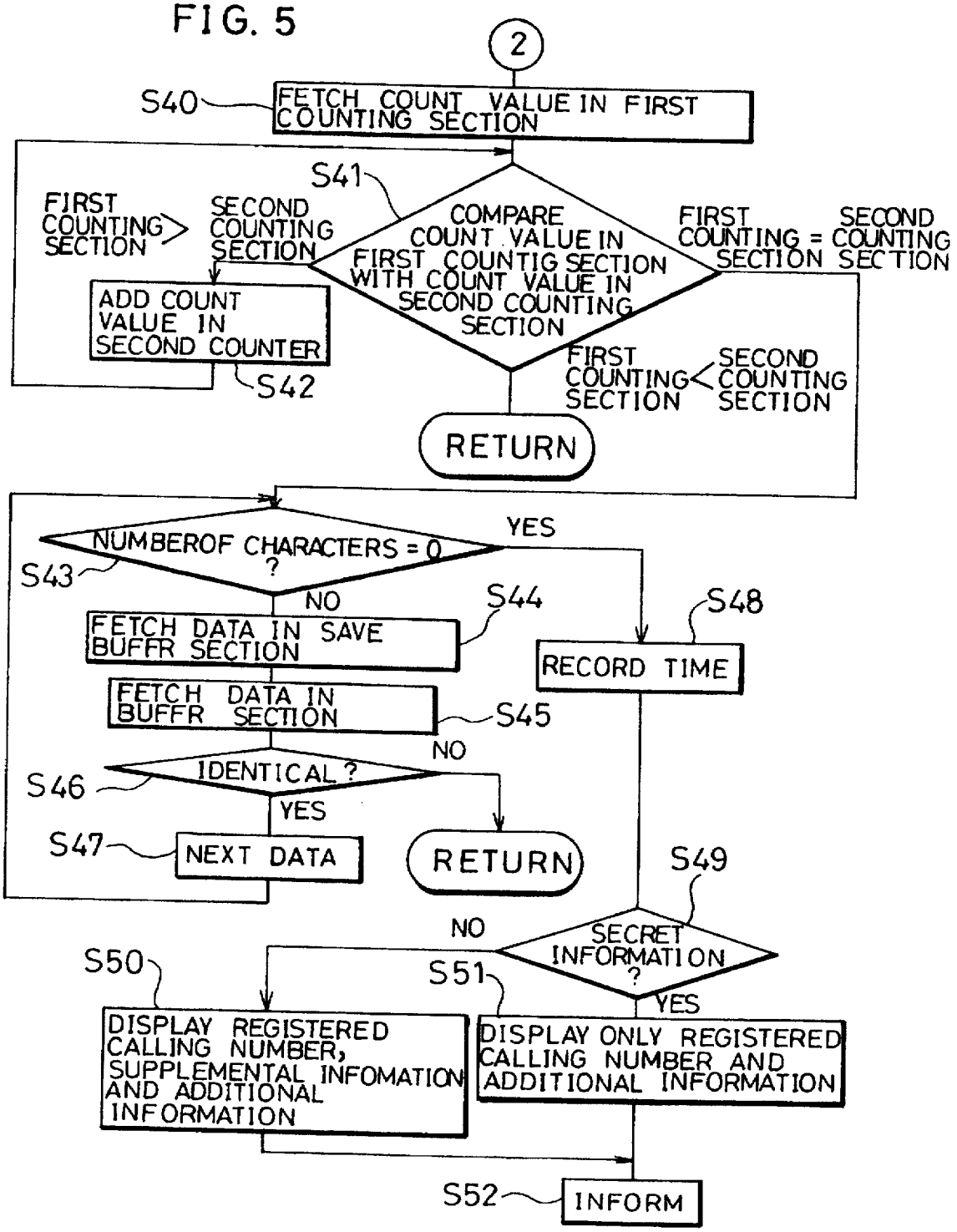
FIG. 5 is a flowchart showing other parts of the calling number identification routine to be performed by the paging device with a message display function of FIG. 1.
Figure 6:
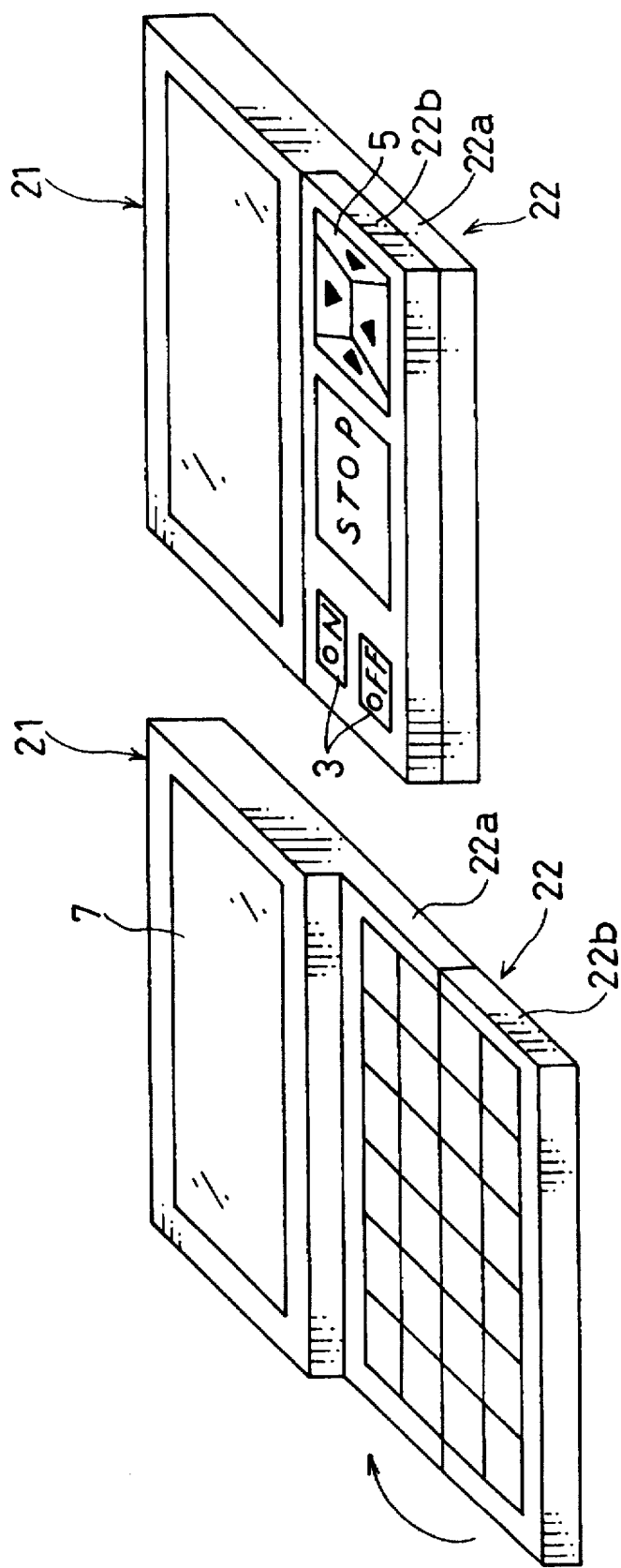

In S40 of FIG. 5, the count value in the first counter section 13b is called to the main detecting section 13g, and as a result of comparison between this value and the value in the first counter $13e_1$ of the second counting section 13e (i.e., the value of the counter for counting the number of numerals in the subscriber number in FIG. 8) (S41), if it is determined that the value in the first counter section 13b is greater, the count value $C_1$ of the first counter $13e_1$ is added to the count value $C_2$ of the second counter $13e_2$ (S42), and the sequence goes back to S41 so as to compare the sum of the count values ($C_1+C_2$) with the count value of the first counter section 13b. As a result of comparison, if the value of the first counter section 13b is greater, the sequence goes back to S42 so as to add the count value $C_3$ of the third counter $13e_3$ of the second counter section 13e to the sum of the count values ($C_1+C_2$), and the sequence goes back to S41 so as to compare the resulting sum of the count values ($C_1+C_2+C_3$) with the value of the first counter section 13b.

On the other hand, if the value in the first counter $13e_1$ of the second counter 13e is greater, it is determined that the registered calling number stored in the buffer section 13d is different from the received calling number stored in the save buffer section 13a. Then, the sequence goes back to S16 in the case of the calling number identification determining routine in S15 or to S18 in the case of the calling number identification determining routine in S17.

Then, if it is determined that the count value in the first counter section 13b is identical with the count value in the second counter section 13e in S41, the processes in S43–S47 are carried out, so as to compare the data in the save buffer section 13a with the data in the buffer section 13d from the last character. More specifically, the received calling number stored in the save buffer 13a and the registered calling number stored in the buffer section 13d are called in the main detecting section 13g in order from the last character (S44 and S45), and it is determined by the main detecting section 13g whether or not the characters of the same digit are identical (S46). If not, it is determined that the registered calling number stored in the buffer section 13d is not identical with the received calling number. Thus, the sequence goes back to S16 in the case of the calling number identification determining routine in S15 or to S18 in the case of the calling number identification determining routine. Then, after determining that all the digits of the received calling number are identical with the registered calling number stored in the buffer section 13d, the sequence goes onto S48.

In S48, the calling number receiving time measured by the timer 12d is stored under social information in the address directory memory section 14a.

Thereafter, it is determined whether or not the supplement information of the registered calling number includes secret information. If it is not specified as secret information, information such as person's name, address, etc., stored in the address directory memory section 14a is fetched as well as the fixed message specifying whether the received number is a telephone number or facsimile number, and the information is combined with the fixed message as additional information to be displayed (S52).

On the other hand, if it is determined that the detected information is specified as secret information in S49, only the calling number stored in the address directory memory section 14a and the additional information in the fixed message memory section 14c are displayed (S51), and an alarm sound is beeped so as to inform the person who possesses the paging device that the calling number is received (S52).

As described, in the present embodiment, the person who possesses the paging device operates the attached input section 2 so as to register plural calling numbers in the memory section 14. Then, upon receiving a calling number, the received calling number is searched from the registered calling number directory stored in the memory section 14, and the registered number corresponding the received number is detected, and the detected registered calling number is displayed on the display section 7. Therefore, by registering the calling number including the area code, even if the calling person transmits the calling number without the area code, the called person can see the full number including the area code, thereby providing a paging device of an improved function.

According to the present embodiment, under the condition that the person who possesses the paging device registers not only plural calling numbers but also corresponding supplemental information including at least a person's name, etc., by operating the attached input section 2, upon receiving the calling number, the detected registered calling number is displayed with supplemental information attached thereto. Therefore, the person who possesses the paging device can see the registered calling number corresponding to the received calling number as well as the name, address, etc., of the person to be called by registering the supplemental information beforehand, thereby providing a paging device with a still improved function. The conventional function of the paging device is not convenient in that the person who possesses the paging device can see the calling person only after calling the person.

Additionally, secret information can also be registered in the memory section 14. Therefore, when displaying supplemental information, it is determined whether or not the supplemental information is the secret information. If so, the display of the supplemental information in the address directory memory section 14a other than the searched registered number is prohibited. Therefore, the secret will not be revealed, thereby providing a paging device with a still improved function.

According to the arrangement of the present embodiment, the telephone numbers and facsimile numbers can be registered separately. Then, it is determined whether the received calling number is a telephone number or a facsimile number. If the received calling number is determined to be a telephone number, a message "Please make a call" is called from the fixed message memory section 14c of the memory section 14 so as to be displayed with the telephone number. Similarly, it the received number is determined to be a facsimile number, a message "Please send a facsimile" is called from the fixed message memory section 14c of the memory section so as to be displayed with the facsimile number. Therefore, the called person can see whether the received calling number is a telephone number or a facsimile number before calling the called person, thereby eliminating the possibility of recalling. As a result, a paging device with a still improved function can be achieved.

The paging device of the present embodiment is also arranged such that the received calling number is searched from the directory of the registered calling numbers by collating respective characters from the last digit. Therefore, for example, when the numbers including the area code "1" ("1-2345" and "1-1234") are registered, and the number "1234" without the area code is received, the extraction of unnecessary information such as 1-2345 can be prevented, thereby improving the efficiency of the searching operation.

In the present embodiment, not only the location of the symbol in the received calling number but also the location of the symbol in the registered calling number, so that a searching is made with respect to only the registered calling numbers having a symbol in the same position as the received calling number. As a result, extraction of unwanted information can be prevented, thereby improving an accuracy of extraction.

According to the arrangement of the present embodiment, the number of numerals contained in the received calling number is counted, and while for the registered calling number, the respective numbers of numerals between symbols are counted. In this way, a searching operation is performed with respect to only the registered numbers which satisfy the following conditions: the sum of the numbers of numerals in the registered calling number coincide with the number of numerals in the received calling number. Therefore, the extraction of unnecessary information can be prevented, thereby obtaining an improved accuracy of extraction.

With the combinations of the described three detecting methods, the extraction of unwanted information can be surely prevented.

The paging device of the present embodiment is arranged such that the transmission information section 15 and the stop key 4 are formed on the main body section 1, and a connecting section 6 as a connector for connecting the main body 1 to the input section 2 is formed on the side face of the main body so as to be detachable from the main body 1. In this way, the input section 2 can be connected to the main body 1 only when necessary, and otherwise the main body 1 can be used alone, thereby achieving an effect of an improved portability by reducing the size of the paging device.

However, the present invention is not limited to the described arrangement provided with the detachable input section 2. For example as shown in FIG. 6(a) and FIG. 6(b), it may be also arranged such that an input section 22 of folding type composed of a fixed section 22a being fixed to the main body 21 and a movable section 22b mounted to the end of the fixed section 22a so as to be freely rotatable is integrally formed on the main body 21. On the respective surfaces of the fixed section 22a and the movable section 22b, the switch key arrays (the same array of keys formed on the input section 2 of FIG. 2) for inputting the calling numbers to be registered, etc., are formed. The paging device having the described arrangement can take the following two positions: a folded position where the array of switch keys on the fixed section 22a and the array of switch keys on the movable section 22b face one another and an open position where the movable section 22b is opened so that the array of the switch keys are exposed (see FIG. 6(a)).

As shown in FIG. 6(b), in the folded position of the input section 22, on the surface of the movable section 22b that can be seen when looking at the display section 7, the power switch 3, keys such as the stop key 4, etc., are formed, which are formed on the main body 1 in the described preferred embodiment.

With the described folding structure of the input section 22, an improved portability can be achieved by reducing the size of the apparatus as in the case of the arrangement of the present embodiment. Additionally, the arrangement offers the effect that information can be inputted through the input section 22 anytime as desired.

Figure 7:
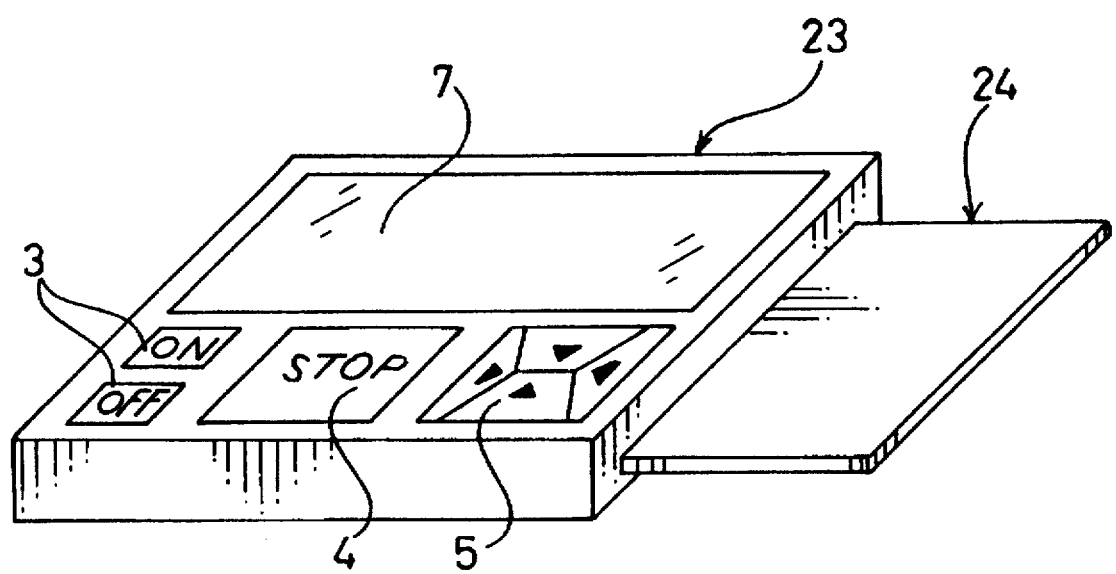
FIG. 7 is a perspective view showing the outer arrangement of the paging device with a message display function in accordance with another embodiment of the present invention.

Alternatively, as shown in FIG. 7, the paging device of the present invention may be also arranged so as to be composed of only a main body section 23 and that the memory section (corresponding to the memory section 14 in FIG. 1) is composed of an IC card 24 which is detachable from the main body 23. In this arrangement, using the electronic organizer etc., necessary information is stored in the IC card, and information is inputted in the main body section 23 through the IC card. This arrangement also offers an improved portability by reducing the size of the apparatus as in the case of the described preferred embodiment. Additionally, the additional effect that the data in the electronic organizer can be used in the paging device if the electronic organizer is compatible with the paging device.

While this invention has been disclosed in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A paging device having a message display function, comprising:

receiving means for receiving information of a calling number;

input means for inputting a calling number including an area code to be registered;

memory means having a memory area for storing plural registered calling numbers inputted by said input means;

search means for comparing the information of a calling number received by said receiving means with a character string of a registered calling number stored in said memory means in order from a last character to a first character so as to search a registered calling number composed of at least a same number of characters as the received calling number and including a same character string starting with a last character as a character string from the last character to the first character of the calling number received by said receiving means; and display means for displaying the registered calling number searched by said search means.

2. The paging device having a message display function as set forth in claim 1, wherein:

said memory means includes a memory area for storing supplemental information including at least a person's name inputted by said input means so as to be paired with a corresponding registered calling number, the supplemental information can be registered as as desired by operating said input means; and said display means also displays the supplemental information corresponding to the registered calling number when displaying the registered calling number searched by said search means.

3. The paging device having a message display function as set forth in claim 2, wherein:

said memory means includes a memory area for storing secret information inputted by said input means so as to be paired with a corresponding registered calling number, the secret information can be registered as desired by operating said input means, said paging device further comprising:

judging means for determining whether or not the secret information is attached to the registered calling number searched by said search means; and inhibit means for inhibiting the supplemental information to be displayed by said display means based on a result of determination by said judging means.

4. The paging device having a message display function as set forth in claim 1, wherein:

said input means can specify each calling number to be registered either as a telephone number or a facsimile number when inputting the calling number;

said memory means includes a first memory area for storing registered calling numbers inputted by said input means in such a manner that said registered calling numbers are classified into telephone numbers and facsimile numbers, and a second memory area for storing plural fixed messages for telephone numbers and facsimile numbers;

said search means includes judging means for determining whether a registered calling number is a telephone number or a facsimile number when detecting the registered calling number corresponding to the received calling number from said first memory area, and selection means for selecting a fixed message for telephone numbers or facsimile numbers from the second memory area based of a result of determination by said judging means; and said display means displays also a fixed message selected by said selection means when displaying the registered calling number searched by said search means.

5. The paging device having a message display function as set forth in claim 1, further comprising:

timer means for measuring a current time; and received time setting means for writing information of the current time measured by said timer means in said memory means upon receiving the information of a calling number.

6. The paging device having a message display function as set forth in claim 1, wherein said search means includes:

a first buffer memory for temporarily storing the received calling number;

second buffer memory for temporarily storing each registered calling number fetched from said memory means in order; and digit identification determining means for determining whether the received calling number stored in said buffer memory is identical with the registered calling number stored in said buffer memory by comparing numbers in order from a last digit.

7. The paging device having a message display function as set forth in claim 1, wherein said search means includes:

first location detecting means for detecting a location of a symbol in the received calling number;

second location detecting means for detecting a location of a symbol in each registered calling number stored in said memory means; and selection means for selecting a registered calling number stored in said memory means, which includes a symbol in a same location as a location detected by said first location detecting means by comparing a result of detection by said first location detecting means and a result of detection by said second location detecting means, wherein said search means performs a searching operation only with respect to registered numbers selected by said selection means.

8. The paging device having a message display function as set forth in claim 7, wherein said first location detecting means includes:

first judging means for determining whether each character in the received calling number is a symbol or a numeral by fetching respective characters of the received calling number in order from a last character; and plural counters for counting a location of each symbol in the received calling number based on a result of determination by said first judging means, and said second location detecting means includes:

second judging means for determining whether each character in each registered calling number is a symbol or a numeral by fetching respective characters of the registered calling number in order from a last character; and plural counters for counting a location of each symbol in the registered calling number based on a result of determination by said second judging means.

9. The paging device having a message display function as set forth in claim 1, wherein said search means includes:

first count means for counting a total number of numerals in the received calling number;

second count means for counting respective numbers of numerals in respective numeral strings divided by at least one symbol in each registered calling number; and selection means for selecting among registered calling numbers stored in said memory means, a registered calling number which includes a combination of values counted by said second count means, which gives a same value as a value of said first count means by comparing the count value of said first count means with respective combinations of values counted by said second count means, wherein search means performs a searching operation with respect to only registered calling numbers selected by said selection means.

10. The paging device having a message display function as set forth in claim 9, wherein said first count means includes:

first judging means for determining whether each character of the received calling number is a symbol or numeral by fetching respective characters of the received calling number in order from a last character; and a single counter for counting only a number of numerals in the received calling number based on a result of determination by said first judging means, and said second count means includes:

second judging means for determining whether each character in the registered calling number is a symbol or a numeral by fetching respective characters of each registered calling number in order from a last character, and plural counters for counting respective numbers of characters in respective numeral strings of the registered calling numbers divided by the symbol in the registered calling number based on a result of determination by said second judging means.

11. The paging device having a message display function as set forth in claim 1, being composed of:

a main body including a connecter for connecting the main body to said input means; and said input means being detachable from the main body through said connector.

12. The paging device having a message display function as set forth in claim 11, wherein:

said main body includes an informing sound generating section for generating an informing sound for informing a user that said receiving means receives the information of a calling number, and an informing sound stop key for stopping the informing sound.

13. The paging device having a message display function as set forth in claim 1, wherein:

said input means can be folded by being composed of a fixed section fixed to a main body and a movable section mounted to one end of the fixed section so as to be freely rotatable, switch key arrays for inputting calling numbers to be registered are formed both on the fixed section and on the movable section, and said input means can take a folded position where a switch key array on the fixed section and a switch key array on the movable section face one another and a key operation permitting position where a key switch array is exposed with an open position of the movable section.

14. The paging device having a message display function as set forth in claim 1, wherein:

said memory means is an IC card detachable from a main body, and said input means is an information input device provided separately from the main body, for permitting information to be written in the IC card.

15. The paging device having a message display function as set forth in claim 14, wherein:

said information input device is an electric organizer.

16. A paging device having a message display function comprising:

receiving means for receiving information comprising a calling number, said information may or may not include an area code;

input means for inputting a calling number that includes an area code as a registered calling number;

memory means having a memory area for storing plural registered calling numbers inputted by said input means;

search detecting means for detecting a registered calling number corresponding to a calling number received by said receiving means, which may or may not include an area code, said search detecting means comparing a character string of a received calling number against a character string of each registered calling number stored in memory, wherein said comparing is performed between characters in respective character strings in a last-to-first sequential character order that begins with respective last characters of said received calling number and a registered calling number and concludes with a first character of said received calling number and a corresponding last-to-first sequential character of said registered calling number; and display means for displaying said corresponding registered calling number, including said area code, detected by said search detecting means.

17. The paging device having a message display function as set forth in claim 16, wherein:

supplemental information including at least a person's name can be stored in said memory means so as to be paired with respective corresponding plural calling numbers by operating said input means, and said display means also displays a corresponding supplemental information when displaying the registered calling number detected by said search detecting means.

18. The paging device having a message display function as set forth in claim 16, wherein:

plural calling numbers can be registered in said memory means so as to be classified into telephone numbers and facsimile numbers as well as plural fixed messages for telephone numbers or facsimile numbers by operating said input means;

said search detecting means detects a registered calling number corresponding to the received calling number by searching, and determines whether the registered calling number detected by said search detecting means is a telephone number or facsimile number; and said display means displays also a corresponding fixed message when displaying the registered calling number searched by said search detecting means.

19. A method for displaying information associated with a calling number from a transmission received in a paging device having a memory, a means for inputting information into the memory, a message display function, and a display, comprising the steps of:

a) registering a calling number along with associated additional information in said paging device by inputting said calling number along with said additional information in a memory in said paging device, said memory means having a memory area for storing plural calling numbers and said additional information;

b) upon receiving a transmitted calling number, detecting a corresponding calling number registered in said paging device by comparing a character string of a received calling number against a character string of each registered calling number stored in memory, said comparing performed between characters in respective character strings in a last-to-first sequential character order that begins with respective last characters of said received calling number and a registered calling number and concludes with a first character of said received calling number and a corresponding last-to-first sequential character of said registered calling number; and displaying said corresponding registered calling number detected in step b), including said area code.

20. A paging device having a message display function comprising:

an RF receiver section, said receiver section receiving a transmitted calling number;

a memory, said memory having a memory area for storing plural registered calling numbers including associated area code information;

a central processor;

a registered calling number search routine stored in said memory and operating said central processor to detect a stored registered calling number corresponding to a calling number received by said receiving means, said search routine comparing a character string of a received calling number against a character string of each registered calling number stored in memory, wherein said comparing is performed between characters in respective character strings in a last-to-first sequential character order that begins with respective last characters of said received calling number and a registered calling number and concludes with a first character of said received calling number and a corresponding last-to-first sequential character of said registered calling number; and a display device, said display device displaying the registered calling number including area code detected by said search routine.

* * * * *